(12) United States Patent
Inoguchi (10) Patent No.: US 7,710,650 B2
(45) Date of Patent: May 4, 2010

(54) DIFFRACTIVE OPTICAL ELEMENT AND OPTICAL SYSTEM HAVING THE SAME

(75) Inventor: Kazutaka Inoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 11/847,003

(22) Filed: Aug. 29, 2007

(65) Prior Publication Data

US 2008/0055727 A1    Mar. 6, 2008

(30) Foreign Application Priority Data

Sep. 4, 2006  (JP) ............................. 2006-238953

(51) Int. Cl.
G02B 5/18    (2006.01)
(52) U.S. Cl. ....................... 359/576; 359/565
(58) Field of Classification Search ................. 359/565, 359/569, 571, 575, 576
See application file for complete search history.

(56) References Cited

U.S. PATENT DOCUMENTS

| | | | |
|---|---|---|---|
| 5,044,706 A | | 9/1991 | Chen |
| 5,790,321 A | | 8/1998 | Goto |
| 5,847,877 A | * | 12/1998 | Imamura et al. ............ 359/566 |
| 6,157,488 A | | 12/2000 | Ishii |
| 6,560,019 B2 | | 5/2003 | Nakai |
| 6,683,718 B2 | | 1/2004 | Sugiyama et al. |
| 6,731,431 B2 | | 5/2004 | Sekine |
| 6,965,476 B2 | | 11/2005 | Sato |
| 2001/0026399 A1 | | 10/2001 | Nakabayashi et al. |
| 2004/0190142 A1 | * | 9/2004 | Kleemann et al. ........... 359/575 |

FOREIGN PATENT DOCUMENTS

| | | |
|---|---|---|
| JP | 4-213421 A | 8/1992 |
| JP | 6-324262 A | 11/1994 |
| JP | 9-127322 A | 5/1997 |
| JP | 10-274705 A | 10/1998 |
| JP | 2000-098118 A | 4/2000 |
| JP | 2000-114143 A | 4/2000 |
| JP | 2000-292668 A | 10/2000 |
| JP | 2001-141918 A | 5/2001 |
| JP | 2002-062417 A | 2/2002 |
| JP | 2002-107523 A | 4/2002 |

* cited by examiner

*Primary Examiner*—Alessandro Amari
(74) *Attorney, Agent, or Firm*—Cannon U.S.A., Inc. I.P. Division (57) ABSTRACT

A diffractive optical element includes a plurality of layered diffraction gratings which includes two diffraction gratings made of materials having different dispersive powers. The plurality of diffraction gratings includes a first diffraction grating having a plurality of grating portions provided on a first base surface, and a second diffraction grating having a plurality of grating portions which are provided on a second base surface. In the second diffraction grating, a height of the grating portion of the central circular zone from the second base surface is greater than a height of the grating portion of the peripheral circular zone from the second base surface.

5 Claims, 12 Drawing Sheets

DIFFRACTIVE OPTICAL ELEMENT AND OPTICAL SYSTEM HAVING THE SAME

BACKGROUND OF THE INVENTION

1. Field of the Invention

The present invention relates to a diffractive optical element and an optical system having the same.

2. Description of the Related Art

Example methods are known in which a diffractive optical element having a diffractive effect is provided at a part of a lens system to reduce chromatic aberration of the lens system (see SPIE Vol. 1354, International Lens Design Conference, 1990, Japanese Patent Laid-Open No. 4-213421 corresponding to U.S. Pat. No. 5,044,706, Japanese Patent Laid-Open No. 6-324262 corresponding to U.S. Pat. No. 5,790,321, and U.S. Pat. No. 5,044,706). This method with the diffractive optical element utilizes a physical phenomenon that chromatic aberrations appear in opposite directions on a refractive surface and a diffractive surface in an optical system when a light beam with a reference wavelength is applied.

Since the diffractive optical element may provide an effect similar to an effect of an aspherical lens by properly changing a cycle of the cyclic structure of the diffractive optical element, the effect may reduce aberrations other than the chromatic aberration.

In a lens system having such a diffractive optical element, when a light beam in a usable wavelength region is concentrated to diffractive light of a certain order (also referred to as predetermined order or designed order), the intensity of diffractive light of other orders becomes low. If the intensity is 0, it means that the diffractive light does not exist. However, unnecessarily diffracted light of the orders other than the designed order actually exists. However, in fact, if the unnecessarily diffracted light has a certain intensity, the light is emitted through the optical system in a path different from that of the light beam of the designed order, resulting in flare.

Because of this, to utilize the aberration reducing effect by way of the diffractive optical element, a diffractive efficiency of the diffractive light of the designed order is required to be reliably high over the usable wavelength region. Also, it is important to carefully consider about a spectral distribution of the diffractive efficiency of the designed order, and a behavior of the unnecessarily diffracted light of the orders other than the designed order.

Various suggestions are made for diffractive optical elements to improve the diffractive efficiency and reduce the unnecessarily diffracted light (see Japanese Patent Laid-Open No. 9-127322 corresponding to U.S. Pat. No. 6,157,488, Japanese Patent Laid-Open No. 2000-98118 corresponding to U.S. Pat. No. 6,560,019, and Japanese Patent Laid-Open No. 2002-107523 corresponding to U.S. Pat. No. 6,683,718). The diffractive optical elements disclosed in these publications have a plurality of layered diffraction gratings, and the material and height of each diffraction grating are properly determined. Accordingly, a high diffractive efficiency is provided for diffractive light of a desired order over a wide wavelength region (about 98% in a wavelength region ranging from 450 to 650 nm). The diffractive efficiency is expressed by a ratio of a light intensity of diffractive light of each order, to a light intensity of the total transmitted light beam.

In such a layered diffractive optical element, if a positional shift is found between the plurality of layered diffraction gratings, a diffractive efficiency of a light beam of an order different from the designed order increases. As a result, when the diffractive optical element is applied to the optical system, the image quality of an obtained image is seriously deteriorated. Therefore, to manufacture the layered diffractive optical element, it is important to highly accurately position the plurality of diffraction gratings to be layered. Example methods for manufacturing diffractive optical elements are known in which a plurality of diffraction gratings are highly accurately positioned and layered (see Japanese Patent Laid-Open No. 2001-141918 corresponding to US Patent Application Publication No. 2001/0026399, Japanese Patent Laid-Open No. 2002-62417 corresponding to U.S. Pat. No. 6,965,476, Japanese Patent Laid-Open No. 10-274705 with no corresponding US patent publication, Japanese Patent Laid-Open No. 2000-292668 with no corresponding US patent publication, and Japanese Patent Laid-Open No. 2000-114143 corresponding to U.S. Pat. No. 6,731,431).

To increase the diffractive efficiency, a distance (air gap) between the plurality of diffraction gratings to be layered should be small.

However, if the air gap becomes small, a grating surface of one diffraction grating may come into contact with a grating surface of the other diffraction grating, causing the grating surfaces to be damaged.

In a case where a thin substrate is used for making the plurality of diffraction gratings, if an external pressure is applied to the diffraction gratings, the substrate may be deformed. Accordingly, the grating surface of the one diffraction grating may come into contact with the grating surface of the other diffraction grating, causing the grating surfaces to be damaged.

To prevent this, a positioning member may be used as a support for preventing the deformation caused by the external pressure.

However, with this method, since the positioning member is generally used only at a small area, if a large external pressure is applied, the substrate may be markedly deformed, and the grating surfaces come into contact with each other, thereby causing the grating surfaces to be damaged.

SUMMARY OF THE INVENTION

The present invention provides a diffractive optical element with which deformation of a substrate caused by an external pressure or the like is prevented, so that a grating surface of one grating portion does not come into contact with a grating surface of the other grating portion to prevent the grating surfaces from being damaged.

A diffractive optical element according to an aspect of the present invention includes a plurality of layered diffraction gratings which includes two diffraction gratings made of materials having different dispersive powers. The plurality of diffraction gratings includes a first diffraction grating having a plurality of circular-zone-like grating portions which are provided on a first base surface, and a second diffraction grating having a plurality of circular-zone-like grating portions which are provided on a second base surface. The plurality of grating portions of the second diffraction grating includes a grating portion of a central circular zone and a grating portion of a peripheral circular zone. In the second diffraction grating, a height of the grating portion of the central circular zone from the second base surface is greater than a height of the grating portion of the peripheral circular zone from the second base surface.

Further features and aspects of the present invention will become apparent from the following description of exemplary embodiments with reference to the attached drawings.

DESCRIPTION OF THE EMBODIMENTS

Various embodiments, features and aspects of the present invention are described below with reference to the attached drawings.

First Exemplary Embodiment

The first exemplary embodiment will now be described according to FIGS. 1 through 5. FIGS. 1 to 4 are schematic illustrations each showing a primary portion of a diffractive optical element according to a first embodiment. While, FIG. 5 is an explanatory illustration showing a wave surface provided by the diffractive optical element according to the first embodiment.

Figure 1:
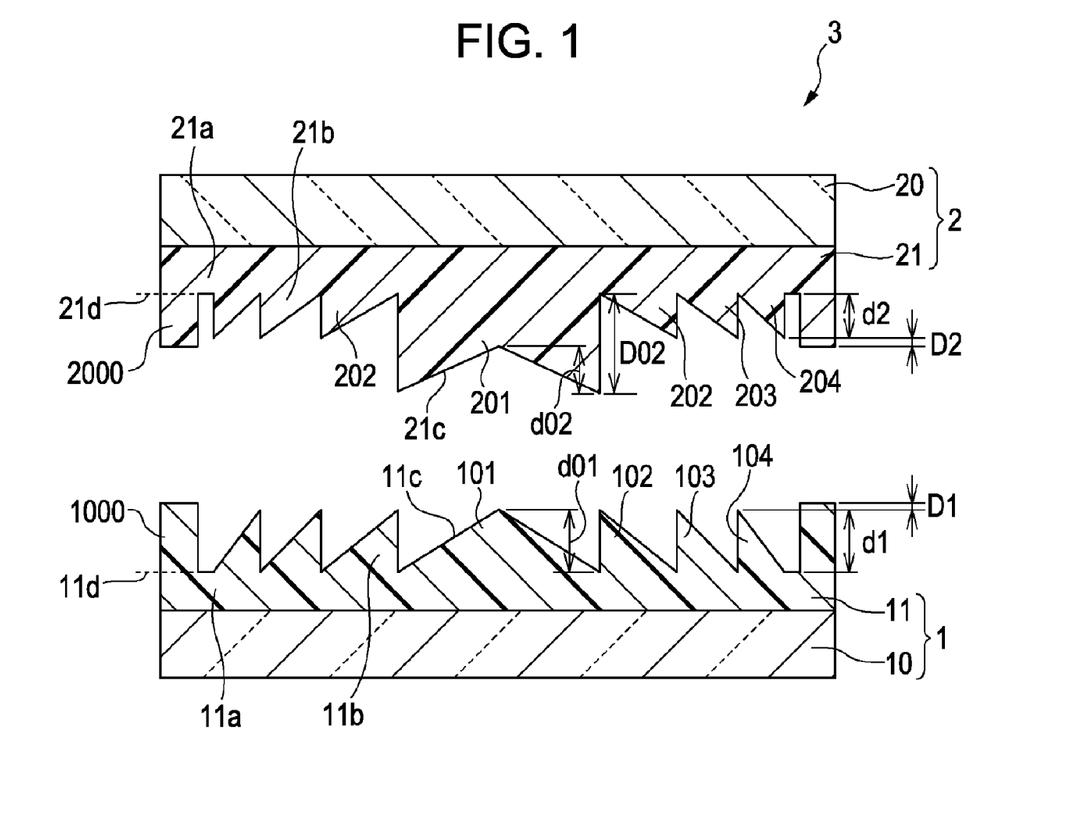
FIG. 1 is a cross-sectional view showing an example diffractive optical element according to a first embodiment before unification.

Now referring to FIG. 1, which is a cross-sectional view showing a state before unification (being layered) to provide a layered diffractive optical element. A layered diffractive optical element 3 is formed by layering a plurality of diffraction gratings. The diffractive optical element 3 includes oppositely arranged first and second element portions 1 and 2 with an air layer interposed therebetween.

The first element portion 1 has a glass substrate 10 and a first blazed diffraction grating 11 which is provided on the surface of the glass substrate 10 and made of UV-curable resin or the like. The second element portion 2 has a glass substrate 20 and a second blazed diffraction grating 21 which is provided on the surface of the glass substrate 20 and made of UV-curable resin or the like.

Figure 2:
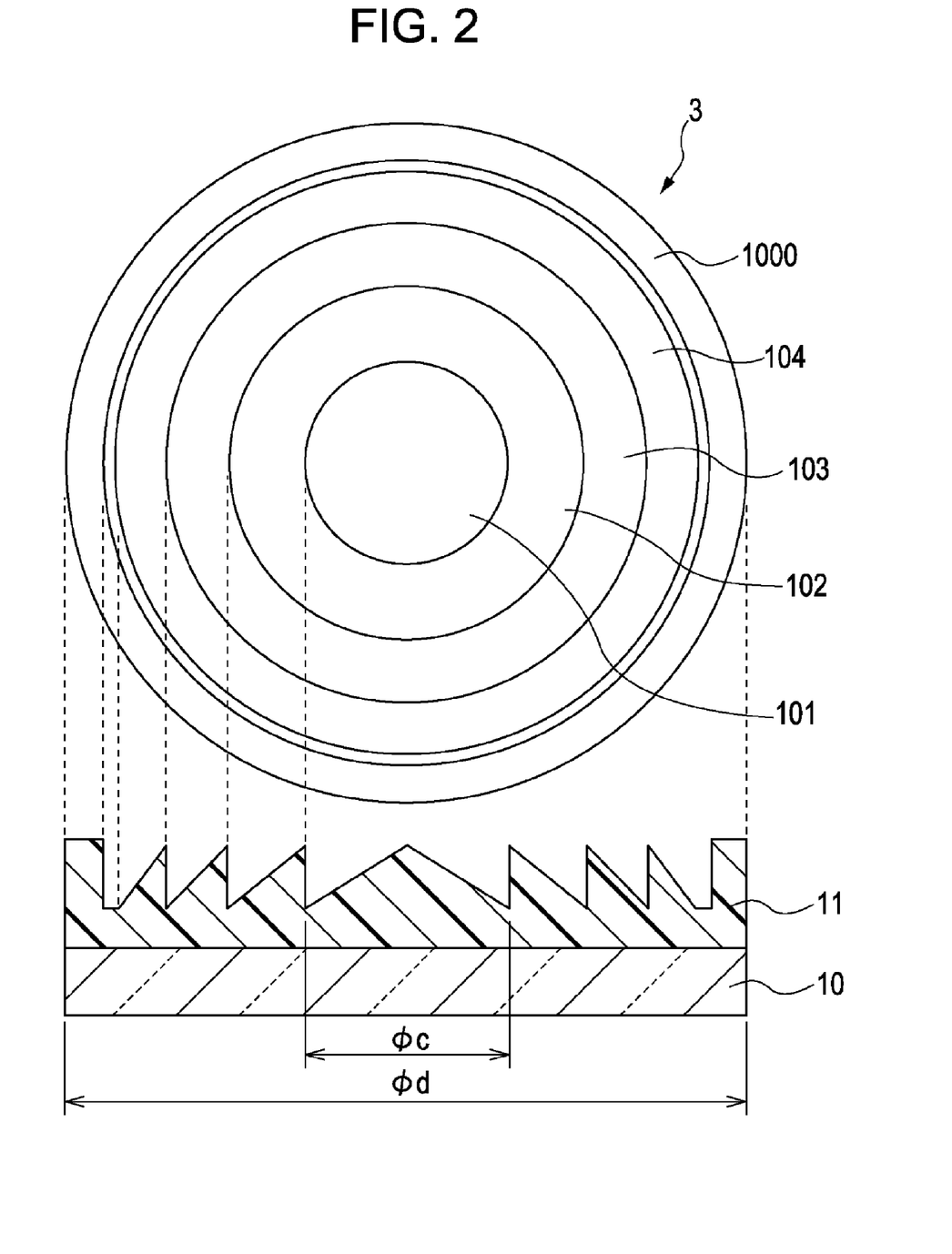
FIG. 2 is a front elevation showing the first embodiment.

FIG. 2 is a front elevation showing the layered diffractive optical element 3 according to the first embodiment. The diffractive optical element 3 has diffraction gratings made of a plurality of circular-zone-like (concentric relief pattern like) grating portions containing central circular zones 101 and 201 (see FIG. 1), and peripheral circular zones 102, 103, 104, 202 203 and 204 (see FIG. 1) arranged around the central circular zones 101 and 201, respectively.

Figure 3:
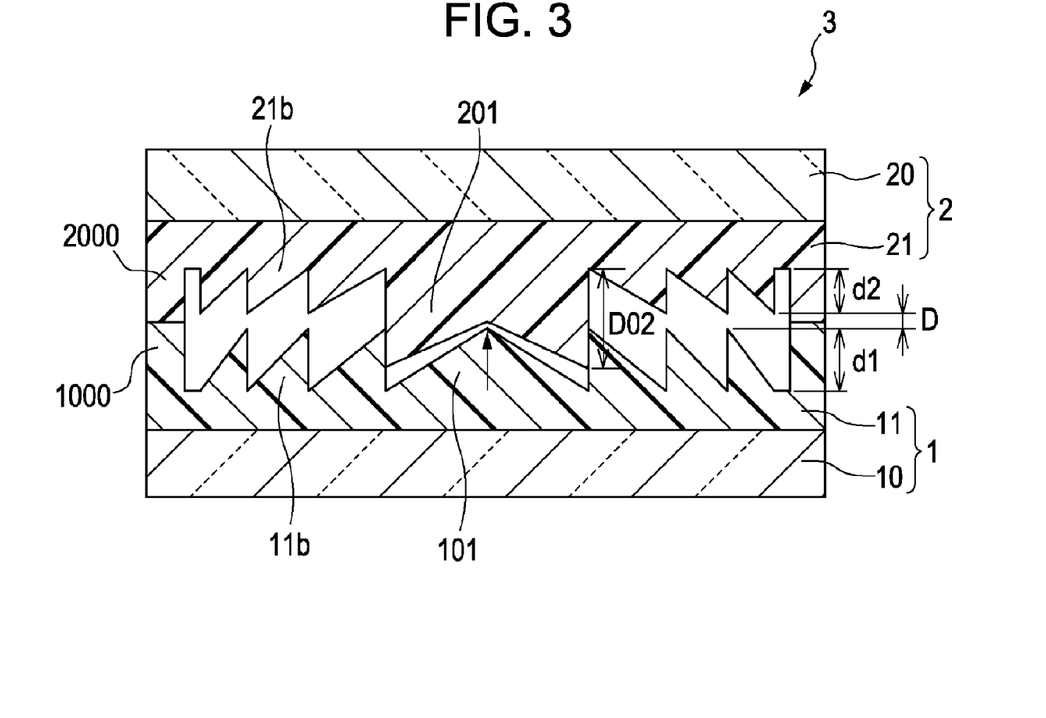
FIG. 3 is a cross-sectional view showing the diffractive optical element according to the first embodiment after the unification.
Figure 4:
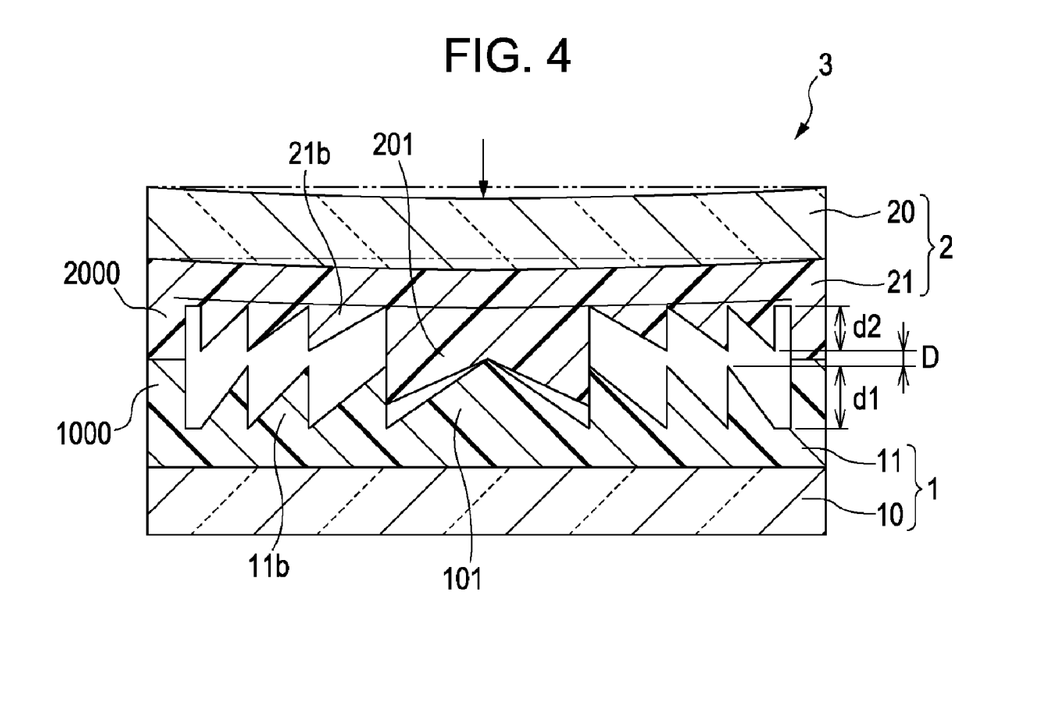
FIG. 4 is a cross-sectional view showing the first embodiment when a pressure is applied to the unified diffractive optical element.
Figure 5:
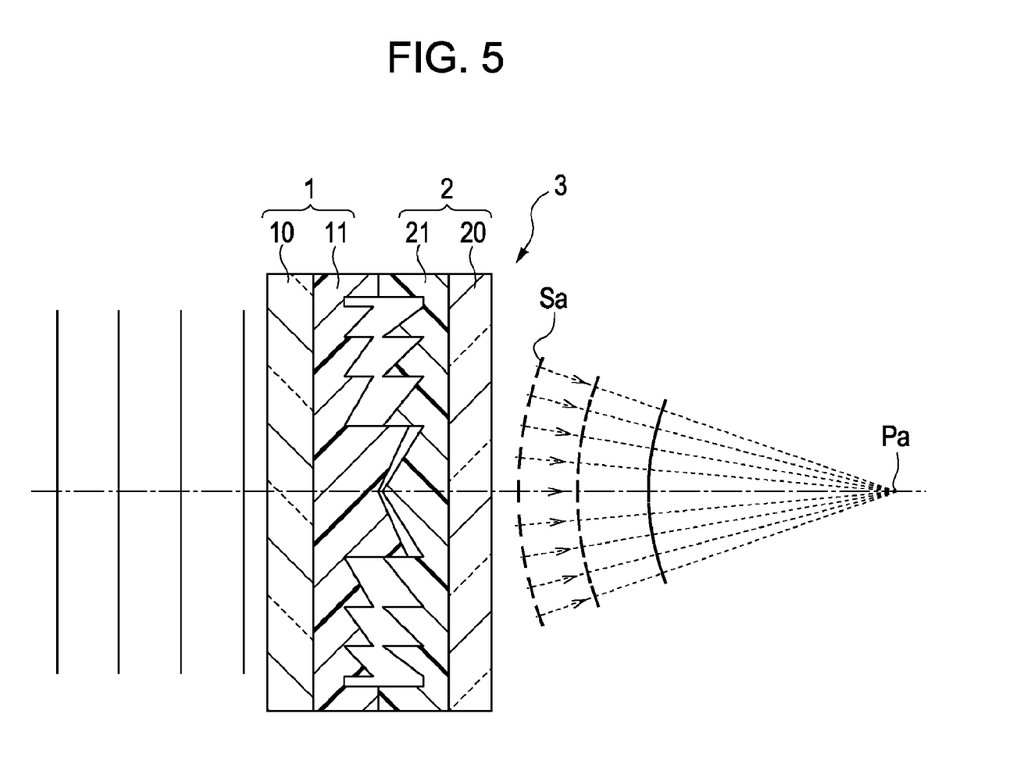
FIG. 5 is an explanatory illustration showing a wave surface provided by the diffractive optical element according to the first embodiment.

FIGS. 3 and 4 are cross-sectional views each showing the layered diffractive optical element 3 according to the first embodiment after the first and second element portions 1 and 2 are unified. In particular, FIG. 3 illustrates a normal state of the unified diffractive optical element 3, and FIG. 4 illustrates a state where an external pressure is applied to the unified diffractive optical element 3 in a direction indicated by an arrow.

The first element portion 1 has the required number of grating portions 11b containing the central circular zone 101 and circular zones 102, 103, . . . in the order toward the outer side. Herein, the circular zones 102, 103, . . . provided around the central circular zone 101, except the central circular zone 101, are referred to as "peripheral circular zones".

The grating height of the grating portions 11b is d1 from a first base surface. A support portion 1000 surrounding the grating portions 11b has a height greater than the height d1 of the grating portions 11b by a height D1. Reference numeral 11a denotes a grating formation material for making the grating portions 11b.

The second element portion 2 has the required number of grating portions 21b containing the central circular zone 201 and circular zones 202, 203, . . . in the order toward the outer side. Similarly to the case of the first element portion 1, the circular zones 202, 203, . . . provided around the central circular zone 201, except the central circular zone 201, are referred to as "peripheral circular zones".

The grating height of the grating portions 21b of the peripheral circular zones except the central circular zone 201 is d2 from a second base surface 21d. A support portion 2000 surrounding the grating portions 21b has a height greater than the height d2 of the grating portions 21b of the peripheral circular zones 202, 203, . . . by a height D2.

Reference numeral 21a denotes a grating formation material for making the grating portions 21b. The grating formation material 11a has a dispersive power different from that of the grating formation material 21a.

Note that "the base surface" is an enveloping surface connecting the vertexes of valleys of the grating portions.

The grating height of the grating portion of the central circular zone 201 of the second element portion 2 is d02 as the profile of the grating portion 21b, and the grating portion is formed on a layer having a height D02-d2 relative to the other grating portions of the peripheral circular zones.

In this embodiment, the two diffraction gratings 11 and 21 are arranged such that a distance between grating surfaces of the grating portions 11b and 21b of the central circular zones 101 and 201 is smaller than a distance between grating surfaces of the grating portions 11b and 21b of the peripheral circular zones.

The grating portions 11b and 21b are disposed at predetermined grating pitches. The first and second diffraction gratings 11 and 21 each have concentric gratings. The grating pitch of the grating portions 11b and 21b gradually becomes small toward the periphery from the center (optical axis), so that a lens effect (convergent effect or dispersive effect) may be provided.

The first and second diffraction gratings 11 and 21 have substantially the same grating pitch distribution, and hence, the widths of the opposing grating portions 11b and 21b substantially correspond to each other.

The entire layers contained in the first and second diffraction gratings 11 and 21 serve as one diffractive optical element.

In this embodiment, the first and second element portions 1 and 2 are positioned and layered by using a known positioning unit. This may also be applied to other embodiments described below.

In FIG. 3, the first and second element portions 1 and 2 are joined at support portions 1000 and 2000 so as to form the layered diffractive optical element 3.

In the diffractive optical element 3, the grating portions 11b of the peripheral circular zones of the first element portion 1 except the grating portion of the central circular zone 101 are arranged oppositely to the grating portions 21b of the peripheral circular zones of the second element portion 2 except the grating portion of the central circular zone 201, with an air layer having a height D ($\approx$D1+D2) interposed therebetween.

In this embodiment, a height D02 of the grating portion 21b of the central circular zone 201 is greater than the height of the other grating portions 21b of the peripheral circular zones. The height D02 may be determined as follows:

$$D+d2<D02<D+d1+d2$$

Accordingly, when an external pressure is applied to the diffractive optical element 3 in the direction indicated by the arrow, as shown in FIG. 4, the grating surfaces 11c and 21c of the central circular zones 101 and 201 are partially or entirely come into contact, but the other grating portions of the peripheral circular zones are not come into contact with each other. This may prevent the grating portions 11b and 21b from being damaged.

In this embodiment, in the second element portion 2, the height of the grating portion of the central circular zone 201 is greater than the height of the other grating portions of the peripheral circular zones with respect to the glass substrate 20; however, a height d02 of the grating portion is equivalent to a height d2 of the other grating portions.

Accordingly, as shown in FIG. 5, in a manner similar to a normal layered diffractive optical element, a phase difference of the first and second element portions 1 and 2 with the air layer interposed therebetween results in a set of plane waves Sa which are converged at a point Pa in accordance with a designed order, the point Pa being located in a predetermined direction.

As described above, with the configuration of this embodiment, the height of the grating portion 21b of the central circular zone 201 of the second diffraction grating 21 is greater than the height of the other grating portions of the peripheral circular zones with respect to the second base surface 21d. Accordingly, the oppositely arranged grating surfaces of the diffraction gratings except those of the central circular zones may be prevented from coming into contact with each other during manufacturing. This may prevent the grating portions 11b and 21b from being damaged during manufacturing.

In addition, in a case where the layered diffractive optical element has a thin substrate while maintaining a performance similar to that of the normal layered diffractive optical element, one grating surface may be prevented from coming into contact with the other grating surface due to deformation caused by an external pressure or the like, and thus, the grating surfaces may be prevented from being damaged.

Second Exemplary Embodiment

Figure 6:
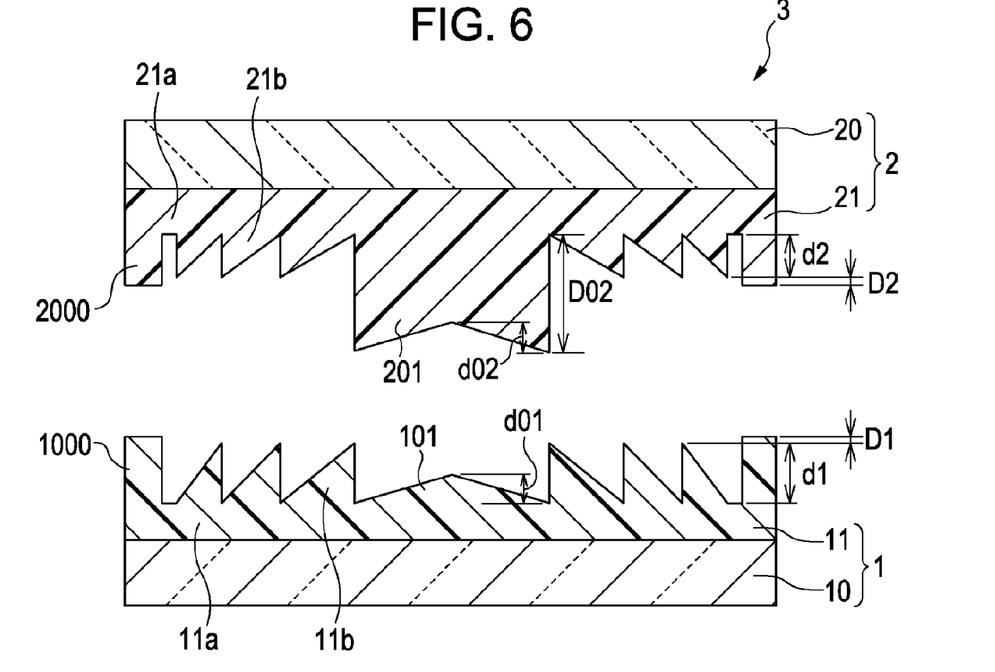
FIG. 6 is a cross-sectional view showing an example diffractive optical element according to a second embodiment before the unification.
Figure 7:
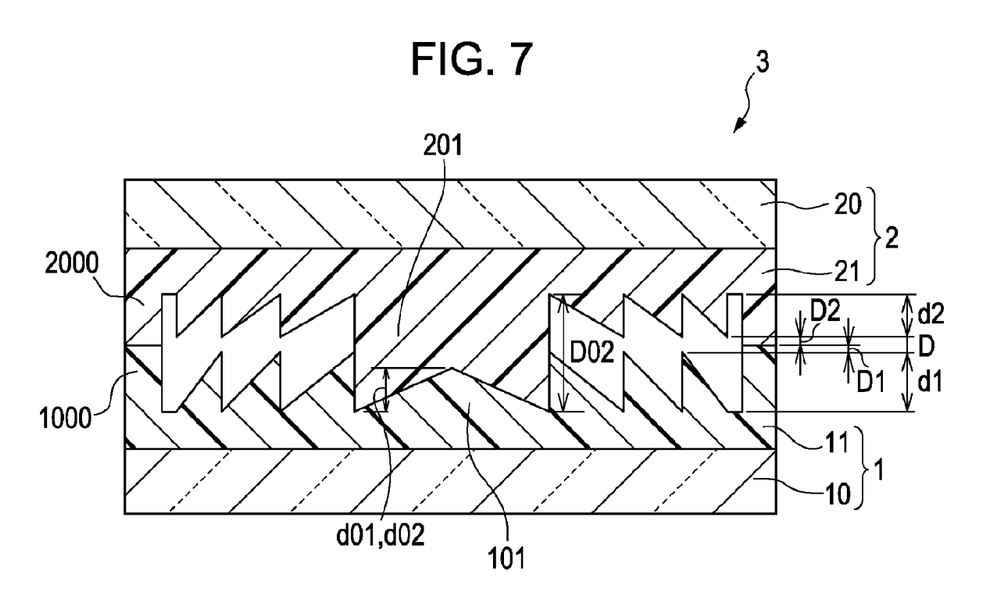
FIG. 7 is a cross-sectional view showing the diffractive optical element according to the second embodiment after the unification.

FIGS. 6 and 7 are schematic illustrations each showing a primary portion of a configuration of a diffractive optical element according to a second embodiment. FIG. 6 is a cross-sectional view showing a state before the unification to provide a layered diffractive optical element. FIG. 7 is a cross-sectional view showing a state after the unification to provide the layered diffractive optical element.

In the second embodiment, in the first and second element portions 1 and 2, heights d01 and d02 of the grating portions of the central circular zones 101 and 201 are different from heights d1 and d2 of the other grating portions, and the height d01 is equalized to the height d02. A height D02 of the grating portion of the central circular zone 201 from the base surface may be determined as follows:

$$(D+d1+d2)/D02=1$$

where D is a distance of an air layer between the first and second element portions 1 and 2. These are different points as compared with the first embodiment. Other configurations are similar to those of the first embodiment.

Herein, (D+d1+d2)/D02=1; however, 0.9<(D+d1+d2)/D02<1.1 is within an allowable range (a range assumed to be (D+d1+d2)/D02=1).

Assume that m (an integer) is a designed order of diffraction for determining an ideal diffraction direction of the diffractive optical element 3 according to this embodiment. Also, n01 is a refractive index with a reference wavelength $\lambda0$ (for example, 550 nm) of the first diffraction grating 11, and n02 is a refractive index of the second diffraction grating 21 with the reference wavelength $\lambda0$. In such a case, when a light beam is vertically incident, the condition required for the heights d1 and d2 is as follows:

$$(n01-1)d1-(n02-1)d2=m\lambda0 \tag{1}$$

On the other hand, the condition required for the grating heights d01 and d02 of the grating portions of the central circular zones 101 and 201 is as follows:

$$n_{01} \cdot d01 - n02 \cdot d02 = m\lambda0 \tag{2}$$

These conditions represent that the grating portions of the central circular zones 101 and 201 are determined by a phase function which is different from that of the other grating portions.

The grating heights of the grating portions of the central circular zones 101 and 201 are determined such that the condition (2) is satisfied and d01$\approx$d02 is satisfied.

In particular, when d01=d02=d, the following condition is satisfied:

$$d=m\lambda0/(n01-n02)$$

This allows the phase difference of the peripheral circular zones to be equalized with that of the central circular zones, and a light beam pointing direction and a diffractive efficiency to be similar to those provided by the normal layered diffractive optical element having two layers with the air layer interposed therebetween.

In addition, as shown in FIG. 7, the central circular zones 101 and 201 come into contact with each other. In particular, not only when the external pressure is applied as in the first embodiment, but also in an initial state after the unification, the surfaces of the central circular zones 101 and 201 come into contact with each other. Since the surfaces are come into contact with each other, a load caused by the external pressure can be spread, thereby providing the diffractive optical element having a high strength. Because of this, in a manner similar to the first embodiment, the other grating portions are prevented from coming into contact with each other, and thus, the grating portions 11b and 21b may be prevented from being damaged.

Figure 8:
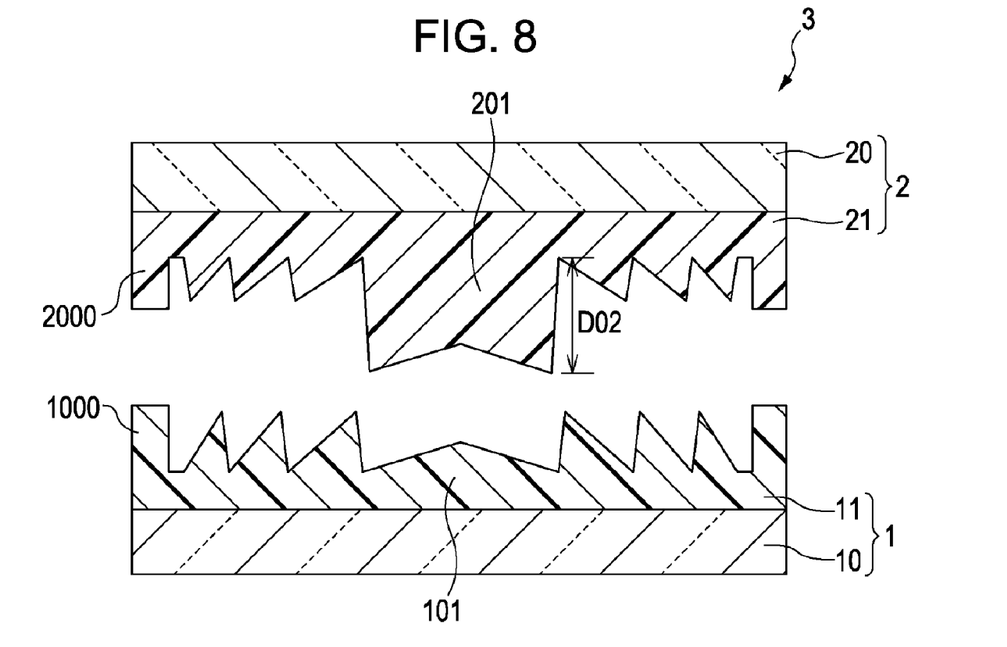
FIG. 8 is a cross-sectional view showing a diffractive optical element according to a modification of the second embodiment before the unification.
Figure 9:
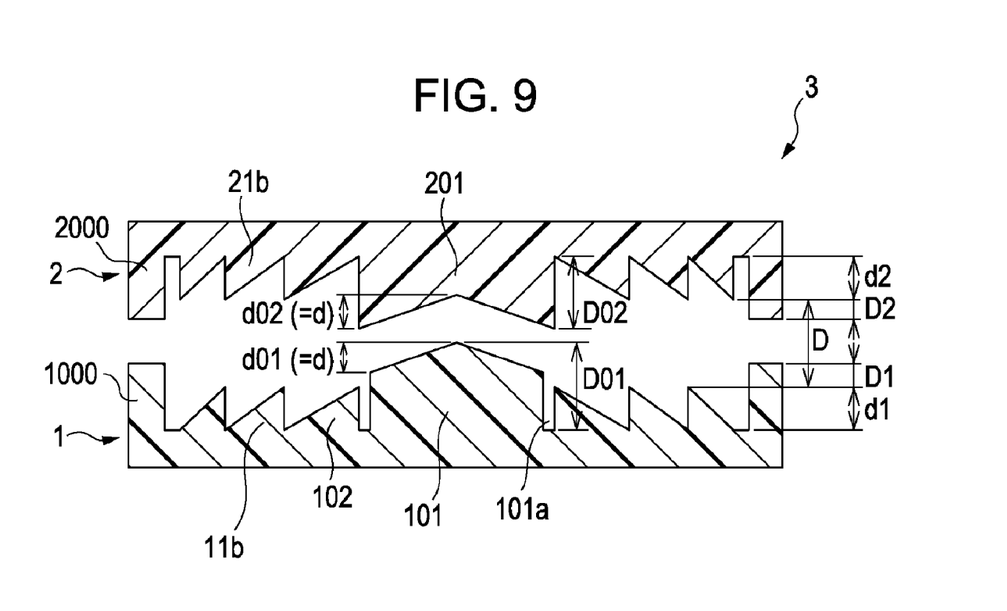
FIG. 9 is a cross-sectional view showing a diffractive optical element according to another modification of the second embodiment before the unification.

In this embodiment, the central circular zones 101 and 201 may be joined together with an adhesive. FIGS. 8 and 9 are illustrations showing modifications of the profiles of the first and second element portions 1 and 2 when the central circular zones 101 and 201 are joined together. In the actual diffractive optical element, as shown in FIG. 8, a surface of the grating portion is not a completely vertical surface but it is slightly inclined. The height of the central circular zone 201 is determined to D02 while a surface thereof extends along the inclined surface.

Accordingly, a gap is provided in a circumferential direction with respect to the central circular zone 101 when these components are joined together. With this configuration, the adhesive may be prevented from being applied to the peripheral grating portions, and the performance of the diffractive optical element may be maintained. In the modification shown in FIG. 9, the heights of the grating portions 11b and 21b are increased to D01 and D02. When being unified, the central circular zones 101 and 201 may be joined together in accordance with the following condition:

$$D01+D02-d=D+d1+d2$$

(only when $d=d01=d02$)

In addition, a gap 101a is provided between the central circular zone 101 of the first element portion 1 and the circular zone 102 adjacent thereto so as to prevent the adhesive from being applied to the grating portions of the peripheral circular zones. Accordingly, reduction in diffractive efficiency may be prevented.

In this embodiment, while the grating portions of the central circular zones 101 and 201 of the first and second element portions 1 and 2 have the heights higher than the heights of the other grating portions of the peripheral circular zones, the phase difference at the central circular zones 101 and 201 in the contact state becomes equivalent to the phase difference of a combination of the other gratings and the interposed air layer.

Figure 10:
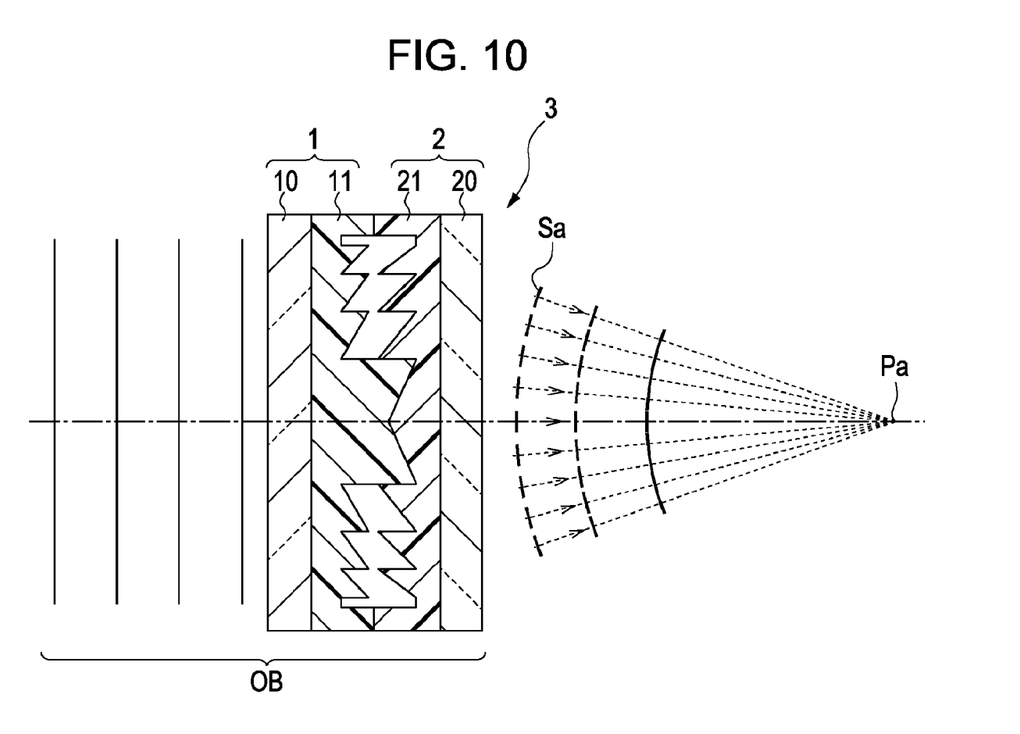
FIG. 10 is an explanatory illustration showing a wave surface provided by the diffractive optical element according to the second embodiment.

Accordingly, as shown in FIG. 10, in a manner similar to the normal layered diffractive optical element, the phase difference of the layered diffractive optical element 3 results in a set of plane waves Sa which are converged at a point Pa in accordance with a designed order, the point Pa being located in a predetermined direction.

Third Exemplary Embodiment

Figure 11:
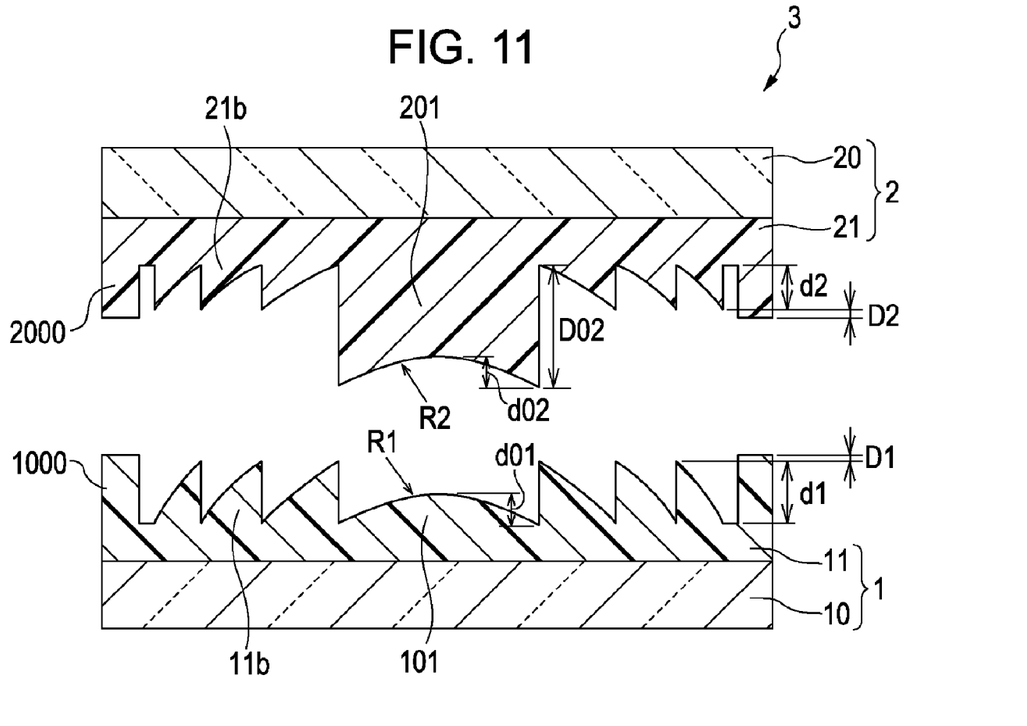
FIG. 11 is a cross-sectional view showing an example diffractive optical element according to a third embodiment before the unification.
Figure 12:
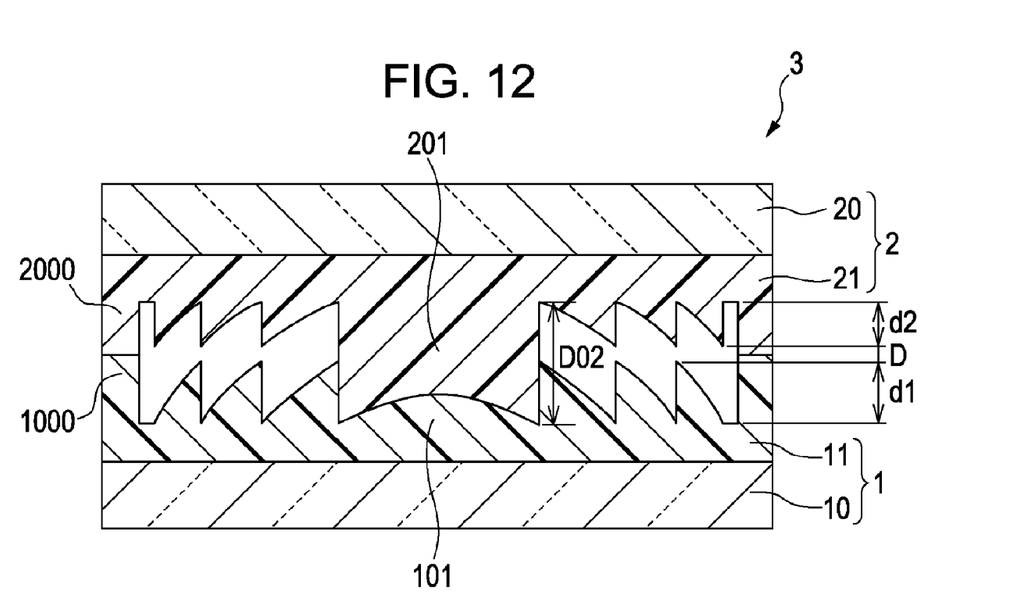
FIG. 12 is a cross-sectional view showing the diffractive optical element according to the third embodiment after the unification.

FIGS. 11 and 12 are schematic illustration each showing a primary portion of a configuration of a diffractive optical element according to a third embodiment. The first and second embodiments provide the first and second element portions 1 and 2 having the blazed profile. In contrast, diffraction gratings of first and second element portions 1 and 2 in this embodiment have a curved grating cross section, which is so-called kinoform profile. Other configurations are similar to those of the second embodiment. Like reference numerals refer like portions, and the descriptions thereof are omitted.

Assume that m is a designed order of diffraction for determining an ideal diffraction direction of the unified diffractive optical element 3 according to this embodiment. Also, n01 is a refractive index with a reference wavelength $\lambda 0$ of a first diffraction grating 11, and n02 is a refractive index of a second diffraction grating 21 with the reference wavelength $\lambda 0$. In this case, in a manner similar to the above-described condition (1), when a light beam is vertically incident, the condition required for heights d1 and d2 is as follows:

$$(n01-1)d1-(n02-1)d2=m\lambda 0 \quad (1)$$

In a phase function $\phi(r)=2\pi/\lambda 0 \cdot \Phi(r)$ as the layered diffractive optical element, an optical path difference function $\Phi(r)$ as an optical path difference may be determined as follows:

$$\Phi(r)=C1\cdot r^2+C2\cdot r^4+C3\cdot r^6+ \quad (3)$$

where r is a distance from the center (the center of the circular zone), and C1, C2, C3 ... are constants.

By using this, heights d1 and d2 of the first and second diffraction gratings 11 and 21 satisfy the following condition:

$$\Phi(r)=(n01-1)d1=m01\lambda 0\Phi(r)=(n02-1)$$
$$d2=m02\lambda 0 m01+m02=m$$

where m01 and m02 are orders of diffraction.

Generally, focal lengths f1 and f2 are determined as follows:

$$f1=-0.5/C1=R1/(n01-1)$$

$$f2=0.5/C1=R2/(n02-1)$$

where R1 and R2 are curvature radii of curved surfaces of the central circular zones of the diffraction gratings 11 and 12 of the layered diffractive optical element. In this embodiment, when R1=R2=R, a focal length f corresponds to a curvature radius R is determined as follows:

$$f=-0.5/C1=R/(n02-n01)$$

In particular, this may be determined as follows:

$$R=-0.5\times(n02-n01)/C1$$

Accordingly, the curvature radii of the central circular zones 101 and 201 may be equalized with each other, and the phase difference generated at the peripheral circular zones of the diffractive optical element may be equalized with the phase difference generated at the central circular zones. This configuration may provide a light beam pointing direction and a diffractive efficiency similar to those provided by the normal layered diffractive optical element having the two layers with the air layer interposed therebetween.

In addition, as shown in FIG. 12, the central circular zones 101 and 201 substantially come into contact with each other. In particular, not only when the external pressure is applied as in the first embodiment, but also in an initial state after the unification, the surfaces of the central circular zones 101 and 201 are configured to come into contact with each other. In this embodiment, since the surfaces are come into contact with each other, a load caused by the external pressure can be spread, thereby providing the diffractive optical element 3 having a high strength. Because of this, in a manner similar to the first embodiment, the other grating portions are prevented from coming into contact with each other, and thus, the grating portions 11b and 21b may be prevented from being damaged.

In this embodiment, the central circular zones 101 and 201 may be joined together with an adhesive. The grating profile of the modification of the second embodiment illustrated in FIGS. 8 and 9 may be a kinoform profile, and the same configuration as that of the modification may be employed.

Figure 13:
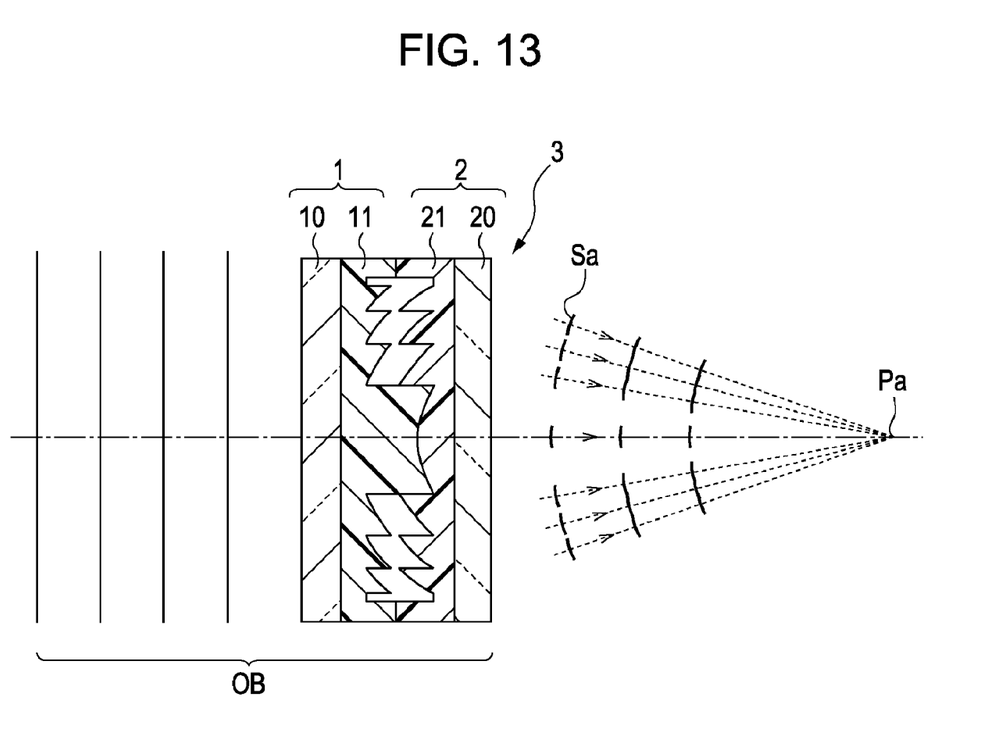
FIG. 13 is an explanatory illustration showing a wave surface provided by the diffractive optical element according to the third embodiment.

In this embodiment, the grating portions of the central circular zones 101 and 201 of the first and second element portions 1 and 2 have heights different from those of the other grating portions of the peripheral circular zones. At this time, the curvature radius is determined such that the phase difference generated when both components are in the contact state becomes equivalent to the phase difference as a combination of the other grating portions and the interposed air layer. Accordingly, as shown in FIG. 13, in a manner similar to the normal layered diffractive optical element, the phase difference of the layered diffractive optical element 3 when being disposed in an optical system OB results in a set of spherical waves Sa which are converged at a point Pa in accordance with a designed order, the point Pa being located in a predetermined direction.

Figure 14:
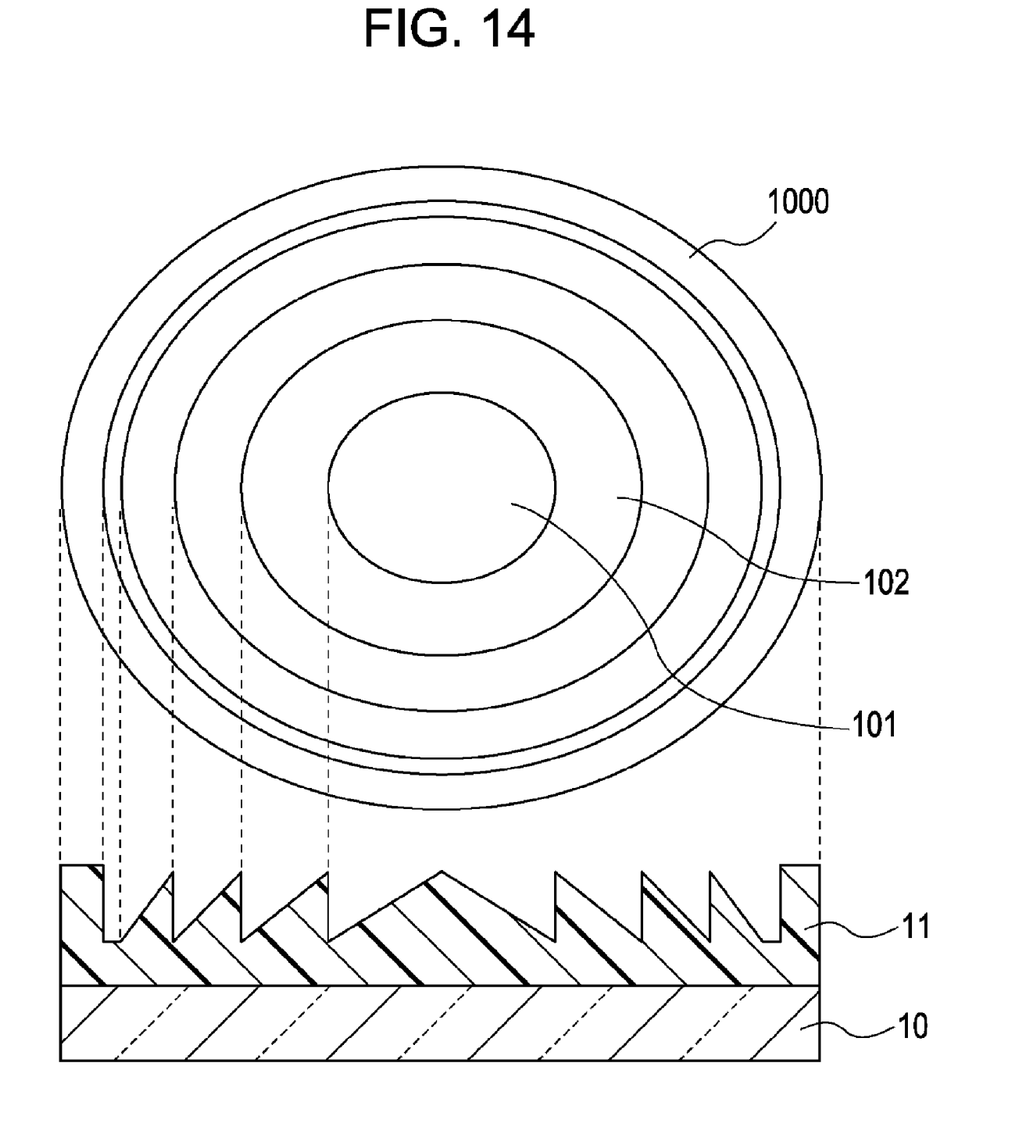
FIG. 14 is a front elevation showing a diffractive optical element according to an embodiment.

In the above embodiments, the diffraction gratings are rotationally symmetric. However, the external profile of the grating portions of the diffraction gratings according to the present invention may have an ellipsoidal circular zones as shown in FIG. 14. Also, the central circular zone 101 may be decentered with respect to the center of the external profile. In such a case, assuming that m is a designed order of diffraction for determining an ideal diffraction direction of the layered and unified diffractive optical element, a height of an area including a portion where φ(r) of the phase function becomes 0 may be greater than a height of the peripheral gratings.

In the above embodiments, the two layers of the diffraction gratings are disposed with the air layer interposed therebetween. However, more than two layers of the diffraction gratings may be disposed with air layers interposed among these layers, or one air layer may be provided between at least two layers of the oppositely arranged diffraction gratings whereas other layers do not contain an air layer. These configurations may attain advantages similar to those provided by the above embodiments.

Figure 17:
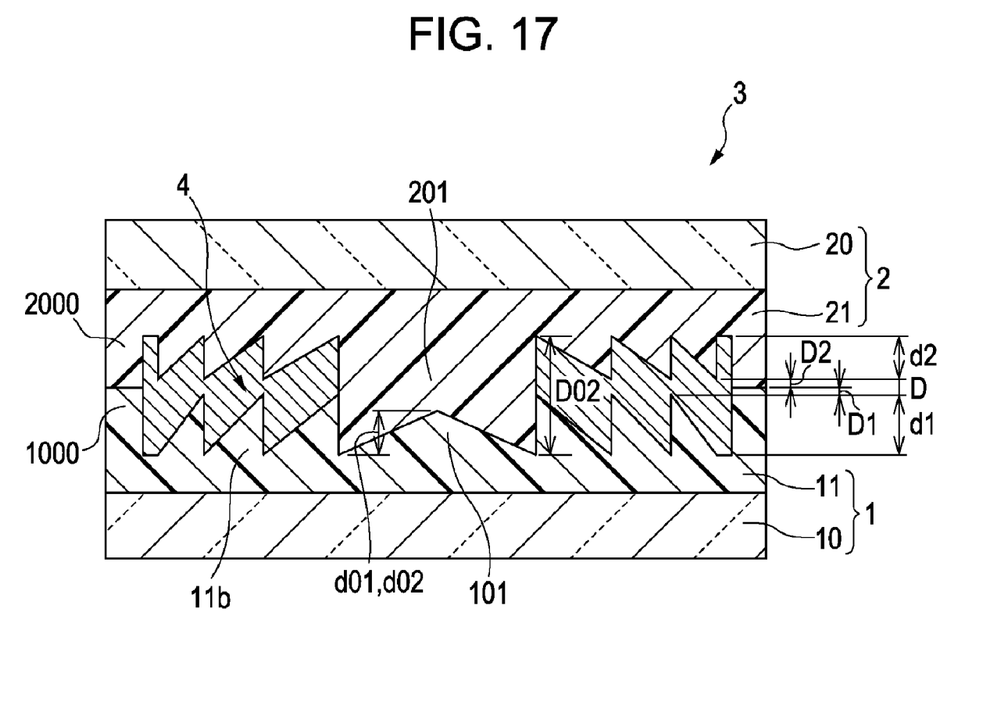
FIG. 17 is a cross-sectional view showing a diffractive optical element according to an embodiment after the unification.

Alternatively, as shown in FIG. 17, the embodiment may employ a configuration having a medium 4 applied between the diffraction gratings 11 and 12. Since the central circular zones first come into contact with each other when one grating surface comes into contact with the other grating surface during manufacturing, the contact between the other grating surfaces may be prevented. Accordingly, an advantage of preventing the grating surface from being damaged may be attained during manufacturing.

In the above embodiments, the two diffraction gratings are formed on the substrates which are independently provided. However, at least one of the diffraction gratings may be integrally formed with the substrate.

In addition, a diameter φc of the central circular zone with respect to a diameter φd of the external profile may be determined as follows:

$$\phi c/\phi d > 1/20$$

More particularly, this may be determined as follows:

$$\phi c/\phi d > 1/10$$

Accordingly, the strength of the diffractive optical element may be increased.

If the external profile is angular, the above condition may be satisfied where φd is a length of a side.

In the above embodiments, when the first and second element portions come into contact with each other (joined with each other), at least 80% of the area of the central circular zones may come into contact with the other. More particularly, at least 90% of the area may be required to be in the contact state. Since the heights and curvature radii of the grating portions are determined in view of the contact state, if a non-contact area is increased, this may cause unnecessarily diffracted light.

While the grating heights of the grating portions except those of the central circular zones are uniform, in a case where the incidence angle of a primary light beam varies in accordance with the location of the diffraction gratings, the height may vary depending on the grating portions. In this case, for example in the first embodiment, the maximum grating height d2 of the grating portion except those of the central circular zone, may be determined as follows:

$$D+d2<D02<D+d1+d2$$

For example in the second and third embodiments, the maximum grating heights d1 and d2 of the grating portions except that of the central circular zones may be determined as follows:

$$0.9<(D+d1+d2)/D02<1.1$$

A distance D (μm) of the air layer between the gratings except the central circular zones may be determined as follows:

$$0\ \mu m < D < 10\ \mu m$$

By satisfying these conditions, a high diffractive efficiency may be provided even when a light beam is incident on the base surface in an inclined manner.

Also, the embodiments may employ a configuration having a registration mark or the like at a center portion.

Figure 15:
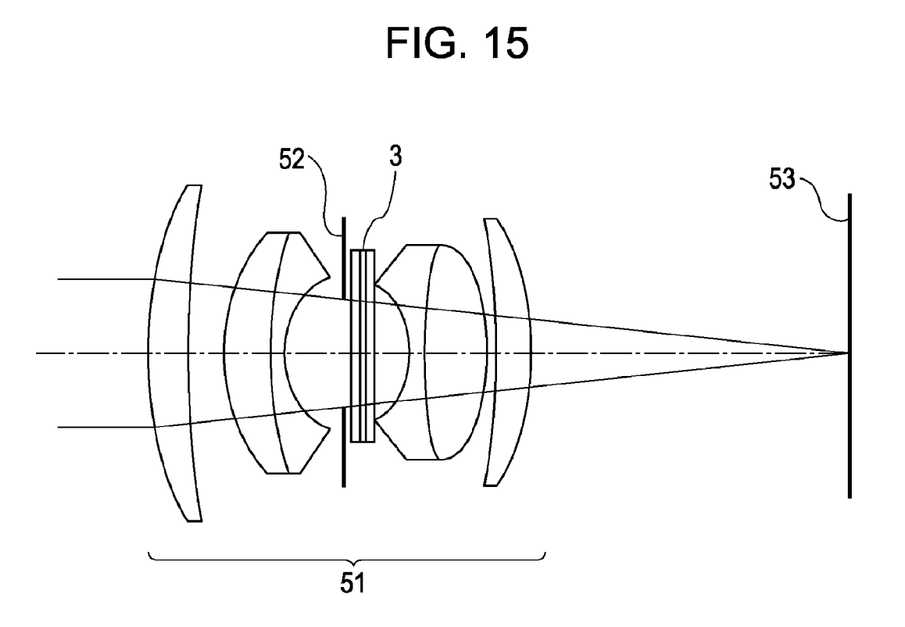
FIG. 15 is a schematic illustration showing a primary portion of an optical system according to a fourth embodiment having the diffractive optical element.

FIG. 15 illustrates an embodiment of an optical system using the above-described diffractive optical element. FIG. 15 shows a cross-sectional view of an imaging optical system used for a digital camera, a video camera, and the like. In FIG. 15, an imaging lens 51 is mainly composed of a refractive lens (a refractive optical element), and has therein an aperture stop 52 and the above-mentioned diffractive optical element 3. An imaging surface 53 corresponds to a film or a charge coupled device (CCD). The diffractive optical element 3 is an element having a lens function, which corrects chromatic aberration of the imaging lens 51.

Figure 16:
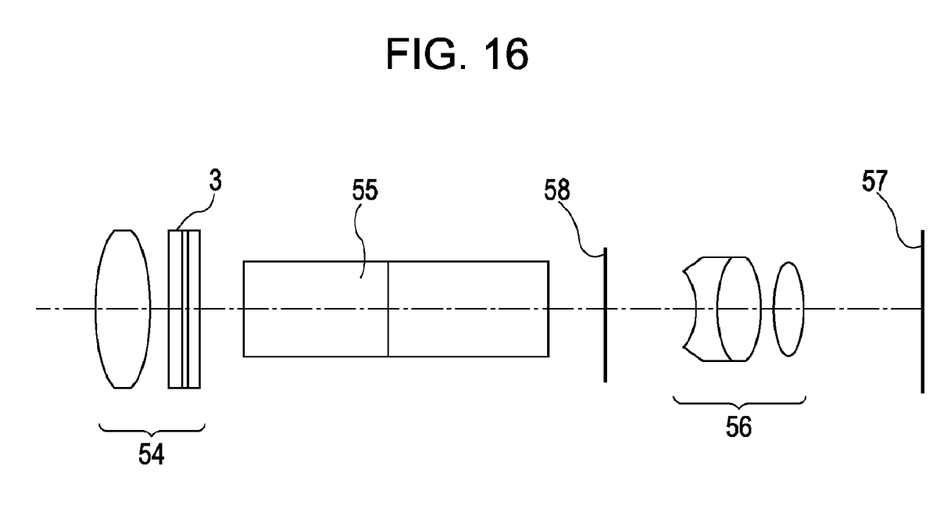
FIG. 16 is a schematic illustration showing a primary portion of an optical system according to a fifth embodiment having the diffractive optical element.

FIG. 16 illustrates an embodiment of an optical system using the above-described diffractive optical element. FIG. 16 shows a cross-sectional view of an observing optical system used for a telescope, a binocular, and the like. In FIG. 16, an objective 54, an image inversion prism 55 for inverting or erecting an image, an eyepiece 56, an evaluation surface (pupil surface) 57, and the above-mentioned diffractive optical element 3 are illustrated. The diffractive optical element 3 is provided for correcting chromatic aberration or the like at the imaging surface 58 of the objective 54.

Without limiting to the embodiments shown in FIGS. 15 and 16, the above-mentioned diffractive optical element may be applied to a zoom lens, a scanner of business equipment, a terrestrial telescope, an astronomic telescope, and the like, and accordingly, advantages similar to the above embodiments may be provided. In addition, the diffractive optical element may be applied to an optical finder for a lens-shutter camera, a video camera, and the like, and accordingly, advantages similar to the above embodiments may be provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-238953 filed Sep. 4, 2006, which is hereby incorporated by reference herein in its entirety.

What is claimed is:

1. A diffractive optical element comprising:
   a plurality of diffraction gratings which includes two diffraction gratings made of materials having different dispersive powers, the plurality of diffraction gratings including,
      a first diffraction grating having a plurality of circular-zone grating portions which are provided on a first base surface, and
      a second diffraction grating having a plurality of circular-zone grating portions which are provided on a second base surface, the plurality of grating portions of the second diffraction grating including a grating portion of a central circular zone and a grating portion of a peripheral circular zone,
   wherein in the second diffraction grating, a height of the grating portion of the central circular zone from the second base surface is greater than a height of the grating portion of the peripheral circular zone from the second base surfaces,
   wherein a grating surface of the grating portion of the central circular zone of the second diffraction grating, and a grating surface of the grating portion of the central circular zone of the first diffraction grating are in a contact state,
   wherein an optical path difference function $\phi(r)$ of the diffractive optical element is determined as follows:

$$\phi(r) = C1 \cdot r^2 + C2 \cdot r^4 + C3 \cdot r^6 +$$

where r is a distance from the center of the diffractive optical element, and C1, C2, C3, . . . are constants, and
      wherein a curvature radius R of each of the grating surfaces of the grating portions of the central circular zones of the first and second diffraction gratings in the contact state satisfies the following condition:

$$R = 0.5 \times (n01 - n01)/C1$$

where n01 is a refractive index of the material of the first diffraction grating with a wavelength $\lambda 0$, and n02 is a refractive index of the material of the second diffraction grating with the wavelength $\lambda 0$.

2. The diffractive optical element according to claim 1, wherein the plurality of grating portions of the first diffraction grating includes a grating portion of a central circular zone and a grating portion of a peripheral circular zone, and
   wherein the grating portion of the peripheral circular zone of the first diffraction grating, and the grating portion of the peripheral circular zone of the second diffraction grating are disposed with an air layer interposed therebetween.

3. The diffractive optical element according to claim 1, wherein in each of the first and second diffraction gratings, a profile of the grating portion of the central circular zone and a profile of the grating portion of the peripheral circular zone are determined in accordance with different phase functions.

4. The diffractive optical element according to claim 1, wherein a grating height d of each of the grating portions of the central circular zones of the first and second diffraction gratings is determined as follows:

$$d = m\lambda 0/(n01 - n02)$$

where n01 is a refractive index of the material of the first diffraction grating with a wavelength $\lambda 0$, n02 is a refractive index of the material of the second diffraction grating with the wavelength $\lambda 0$, and m is an integer.

5. An optical system comprising:
   a diffractive optical element which includes,
      a plurality of diffraction gratings which includes two diffraction gratings made of materials having different dispersive powers, the plurality of diffraction gratings including,
         a first diffraction grating having a plurality of circular-zone grating portions which are provided on a first base surface, and
         a second diffraction grating having a plurality of circular-zone grating portions which are provided on a second base surface, the plurality of grating portions of the second diffraction grating including a grating portion of a central circular zone and a grating portion of a peripheral circular zone,
      wherein in the second diffraction grating, a height of the grating portion of the central circular zone from the second base surface is greater than a height of the grating portion of the peripheral circular zone from the second base surface; and
   a refractive optical elements,
   wherein a grating surface of the grating portion of the central circular zone of the second diffraction grating, and a grating surface of the grating portion of the central circular zone of the first diffraction grating are in a contact state,
   wherein an optical path difference function $\phi(r)$ of the diffractive optical element is determined as follows:

$$\phi(r) = C1 \cdot r^2 + C2 \cdot r^4 + C3 \cdot r^6 +$$

where r is a distance from the center of the diffractive optical element, and C1, C2, C3, . . . are constants, and
      wherein a curvature radius R of each of the grating surfaces of the grating portions of the central circular zones of the first and second diffraction gratings in the contact state satisfies the following condition:

$$R = 0.5 \times (n02 - n01)/C1$$

where n01 is a refractive index of the material of the first diffraction grating with a wavelength $\lambda 0$, and n02 is a refractive index of the material of the second diffraction grating with the wavelength $\lambda 0$.

* * * * *